United States Patent [19]

Fraser

[11] 4,032,354
[45] June 28, 1977

[54] SURFACE-COATING COMPOSITIONS CONTAINING CALCIUM SALT LOSS-OF-DRY INHIBITORS AND A METHOD OF PREPARING SAME

[75] Inventor: Irene A. E. Fraser, Toronto, Canada

[73] Assignee: Tenneco Chemicals, Inc., Saddle Brook, N.J.

[22] Filed: Oct. 20, 1975

[21] Appl. No.: 623,881

[30] Foreign Application Priority Data

Nov. 25, 1974 Canada .............................. 214559

[52] U.S. Cl. .................. 106/260; 106/28; 106/264; 106/310; 260/22 A
[51] Int. Cl.² ................................... C09D 3/26
[58] Field of Search .............. 106/260, 264, 310; 252/38; 260/22 A

[56] References Cited

UNITED STATES PATENTS

| | | | |
|---|---|---|---|
| 3,124,475 | 3/1964 | Fischer | 106/310 |
| 3,901,837 | 8/1975 | Gottesman | 106/264 |
| 3,941,606 | 3/1976 | Collins | 106/310 |

*Primary Examiner*—Theodore Morris
*Attorney, Agent, or Firm*—Evelyn Berlow

[57] ABSTRACT

Surface-coating compositions that comprise an oxidizable organic film-forming resinous vehicle containing from 0.5% to 5.0%, based on vehicle solids, of a loss-of-dry inhibitor that is a suspension of finely divided calcium hydroxide in a solution containing at least one calcium salt of a branched-chain aliphatic monocarboxylic acid having 6 to 14 carbon atoms, a cycloaliphatic monocarboxylic acid having 6 to 10 carbon atoms, or a mixture of these acids.

23 Claims, No Drawings

SURFACE-COATING COMPOSITIONS CONTAINING CALCIUM SALT LOSS-OF-DRY INHIBITORS AND A METHOD OF PREPARING SAME

This invention relates to calcium salt loss-of-dry inhibitors and to the use of these loss-of-dry inhibitors in protective and decorative surface-coating compositions that contain an oxidizable organic vehicle. It further relates to surface-coating compositions that contain these loss-of-dry inhibitors.

Metal salts of organic acids have long been used in surface-coating compositions that contain drying oils and other oxidizable vehicles to accelerate the drying process and to promote the polymerization of the unsaturated oils to dry, mechanically-resistant coatings. The metal salt driers perform efficiently when they are first incorporated into an oxidizable coating, but the coatings frequently exhibit a loss of drying rate on aging. This loss of drying rate probably results from the adsorption of the metal salts on the surfaces of the pigments and extenders in the coating or from the inactivation of the driers by the reaction of the soluble metal salts with acidic components of the coating system to form insoluble metal compounds, which do not function as driers.

The loss of drying rate that coating compositions undergo on storage can be inhibited or prevented by incorporating a loss-of-dry inhibitor in the coating. A number of loss-of-dry inhibitors have been proposed for use in oxidizable surface-coating compositions, but none has proven to be entirely satisfactory. For example, basic lead naphthenate has been widely used to prevent changes in the drying rate of surface-coating compositions on aging. The use of this loss-of-dry inhibitor has recently been restricted by legislation that drastically limits the amount of lead components that can be present in surface-coating compositions. Basic cobalt naphthenate is also an effective loss-of-dry inhibitor for oxidizable coating systems. Because it causes unacceptable staining in white and pastel coatings, this inhibitor can only be used in dark-colored coatings. Moreover, basic cobalt naphthenate often causes extensive wrinkling in paint films when it is used in the amounts that are necessary to give commercially-acceptable drying times.

It has now been found that the loss of drying rate on aging of surface-coating compositions that contain oxidizable organic vehicles can be minimized or prevented by incorporating in these compositions a loss-of-dry inhibitor that is a combination of oil-soluble and oil-insoluble calcium salts. These calcium salt loss-of-dry inhibitors are at least as effective as the previously-known loss-of-dry inhibitors. They do not, however, contain toxic metal salts, and they do not cause staining of white and pastel coatings at the levels at which they are used to inhibit loss of dry. In addition to serving as loss-of-dry inhibitor in surface-coating compositions that contain conventional metal salt driers, the calcium salt compositions of this invention can be used as a combination drier-loss-of-dry inhibitor in coating compositions that do not contain metal salt driers.

The loss-of-dry inhibitors of this invention are suspensions of calcium hydroxide in solutions that contain at least one oil-soluble calcium salt of a monocarboxylic acid. When incorporated in surface-coating compositions, these loss-of-dry inhibitors act as feeder driers; that is, they function by having the insoluble highly-reactive suspended material slowly become oil-soluble and replace the driers that have been inactivated.

The calcium salt loss-of-dry inhibitors contain from about 5% to 25% by weight, and preferably 6% to 15% by weight, of finely divided calcium hydroxide suspended in solutions that contain one or more oil-soluble calcium salts of monocarboxylic acids. The total calcium content of these loss-of-dry inhibitors is in most cases between 5% and 20% by weight. The best results have been obtained using loss-of-dry inhibitors that contain from 7% to 15% by weight of calcium.

While its particle size is not critical, the calcium hydroxide should be sufficiently finely divided to allow it to remain in suspension in the calcium salt solution for at least several days. It is preferred that the calcium hydroxide be so finely divided that the calcium salt loss-of-dry inhibitor will have a degree of dispersion of at least 5, and in most cases 6 or more, on the Hegman Scale, as determined by ASTM Method D-1210-64.

The novel loss-of-dry inhibitors are suspensions of finely divided calcium hydroxide in solutions that contain at least one calcium salt of a branched-chain aliphatic monocarboxylic acid having 6 to 14 carbon atoms, a cycloaliphatic monocarboxylic acid having 6 to 10 carbon atoms, or a mixture of these acids. Illustrative of these acids are 2-ethylbutanoic acid, 2,2-dimethylpentanoic acid, 2-ethylpentanoic acid, 2-ethyl-4-methylpentanoic acid, 2-ethylhexanoic acid, isooctanoic acid, isononanoic acid, isodecanoic acid, 2-ethyldecanoic acid, isotridecanoic acid, isotetradecanoic acid, cyclopentanoic acid, methylcyclopentanoic acid, cyclohexanoic acid, methylcyclohexanoic acid, 1,2-dimethylcyclohexanoic acid, cycloheptanoic acid, and the like. The solutions preferably contain calcium salts of branched-chain aliphatic monocarboxylic acids having 8 to 10 carbon atoms, such as 2-ethylhexanoic acid, isooctanoic acid, 2,2-diethylhexanoic acid, 2-methyl-2-ethylheptanoic acid, 2,2-dimethyloctanoic acid, 2-propylheptanoic acid, 3,5,5-trimethylhexanoic acid, 3-ethyloctanoic acid, isononanoic acid, and isodecanoic acid; naphthenic acids, such as cyclopentanoic acid, cyclohexanoic acid, cycloheptanoic acid, and methylcyclohexanoic acid; and mixtures of two or more of these acids. Particularly satisfactory results have been obtained when the solutions contained calcium naphthenate or mixtures of calcium naphthenate with one or two other oil-soluble calcium salts, for example, calcium 2-ethylhexanoate, calcium isononanoate, or calcium neodecanoate.

The oil-soluble calcium salts are dissolved in inert non-polar organic solvents, which are preferably hydrocarbons or halogenated hydrocarbons. The preferred solvents included aliphatic and cycloaliphatic hydrocarbons such as hexane, heptane, octane, isooctane, cyclohexane, and cycloheptane; petroleum distillates such as mineral spirits, gasoline, diesel fuel, mineral oil, and fuel oils; aromatic hydrocarbons such as benzene, toluene, xylene, and ethylbenzene; and chlorinated compounds such as chlorobenzenes, carbon tetrachloride, and ethylene dichloride. The most satisfactory solvent for the calcium salts is mineral oil.

The loss-of-dry inhibitors may be prepared by any suitable and convenient procedure. For example, they may be prepared by a process in which a suspension of finely-divided calcium hydroxide in an inert solvent, such as mineral oil or mineral spirits, is heated with at least one organic acid as hereinbefore defined. The reaction is usually carried out in the presence of an amount of water or other catalyst that will initiate the reaction of calcium hydroxide with the organic acid. When the evolved water has been removed, additional solvent may be added to bring the calcium content of the product to the desired level. The resulting calcium salt composition may be used without further treatment as the loss-of-dry inhibitor in coating compositions.

The loss-of-dry inhibitor may, if desired, contain an additive that modifies its viscosity. Such additives include, for example, the polyoxyalkylene glycols that are disclosed in U.S. Pat. No. 2,807,553.

The calcium salt loss-of-dry inhibitors of this invention can be used to inhibit the loss of drying rate of a wide variety of surface-coating compositions including paints, varnishes, enamels, printing inks, and the like that contain an oxidizable organic film-forming resinous vehicle. The vehicle may be a drying oil or semi-drying oil, such as linseed oil, soybean oil, tung oil, or dehydrated castor oil, either in the raw, blown, or heat-bodied form. Alternatively, the vehicle may be an alkyd resin, which is the product of the reaction of a polyhydric alcohol, such as pentaerythritol or glycerol, with a dicarboxylic acid, such as phthalic anhydride or isophthalic acid, and a monocarboxylic acid, such as soybean oil fatty acids or linseed oil fatty acids, or an oleoresinous varnish, which is the product of the reaction of one of the aforementioned drying oils or semi-drying oils with rosin, a modified rosin, or a phenolic resin.

The surface-coating compositions to which the loss-of-dry inhibitors are added preferably contain conventional metal salt driers. Among the most widely-used of these driers are the lead, cobalt, manganese, calcium, zirconium, and zinc salts of naphthenic acids, octanoic acids, nonanoic acids, and tall oil acids.

In addition to the oxidizable organic film-forming resinous vehicle, the calcium salt loss-of-dry inhibitor, and metal salt driers, the surface-coating compositions of this invention may contain pigments, extenders, solvents, plasticizers, antiskinning agents, and other additives in the amounts ordinarily used in such compositions. Illustrative of the pigments that are used in surface-coating compositions are titanium dioxide, ferric oxide, calcium oxide, zinc oxide, antimony trioxide, kaolin, china clay, calcium carbonate, silica, talc, zinc chromate, carbon black, and mixtures thereof. The useful solvents include benzene, toluene, xylene, naphtha, mineral spirits, hexane, isooctane, and petroleum ether as well as water for water-based surface-coating compositions.

The invention is further illustrated by the following examples.

EXAMPLE 1

A mixture of 424 grams of calcium hydroxide and 576 grams of mineral oil was ground overnight in a ball mill. The resulting paste contained 22.2% calcium and had a degree of dispersion of 6+ on the Hegman Scale, as determined by ASTM Method D-1210-64.

A 630 gram portion of the paste was transferred to a flask equipped with a thermometer, a high speed propeller-type agitator, a condenser, and a means for heating. The paste was agitated while 40 grams of tripropylene glycol, 1 gram of water, 215.5 grams of naphthenic acid, 64.4 grams of 2-ethylhexanoic acid, and 40 grams of mineral oil were added to it. The mixture was heated gradually to 115°–120° C. and held at that temperature until the boiling subsided. Vacuum was applied for 20 minutes during which time all of the evolved water was removed from the flask.

The resulting product was a suspension of finely divided calcium hydroxide in a solution of basic calcium napthenate and basic calcium 2-ethylhexanoate in mineral oil. It was a paste that had a calcium content of 14.0% by weight.

EXAMPLE 2

Mineral oil (690 grams) and calcium hydroxide (135.7 grams) were mixed in a Eppenbach Homomixer for 15 minutes. Then 2 grams of water, 139 grams of naphthenic acid, and 5 grams of tripropylene glycol were added while the mixing was continued. The reaction mixture was heated at 120° C. with agitation for 5 minutes and then cooled to room temperature. There was obtained 950 grams of a calcium salt composition that was a suspension of calcium hydroxide in a solution of basic calcium naphthenate in mineral oil. This product had a calcium content of 7.0% by weight and a degree of dispersion of 7+ on the Hegman Scale.

EXAMPLE 3 a. A white enamel was prepared by grinding the following materials together in a pebble mill: Parts by Weight

|  | Parts by Weight |
|---|---|
| Titanium dioxide (rutile) | 75.0 |
| Zinc Oxide | 7.5 |
| Long oil soybean oil - phthalic anhydride alkyd resin (Aroplaz 1241-70) | 120.0 |
| Mineral Spirits | 24.0 |

A drier system containing 0.06%, based on the weight of vehicle solids, of cobalt as cobalt 2-ethylhexanoate and cobalt isononanoate and 0.12%, based on the weight of vehicle solids, of zirconium as zirconium 2-ethylhexanoate and zirconium isononanoate was incorporated into the white enamel.

b. To portions of the white enamel were added either (i) 1.5%, based on the weight of vehicle solids, of the product of EXAMPLE 1, (ii) 0.3%, based on the weight of vehicle solids, of a commercially-available loss-of-dry inhibitor that contains basic cobalt naphthenate (Cobalt 254), or (iii) 1.25%, based on the weight of vehicle solids, of a commercially-available loss-of-dry inhibitor that contains basic lead naphthenate (Nuact).

The product of Example 1 was added to the enamel at the let-down stage. The basic cobalt naphthenate and the basic lead naphthenate were ground into the enamel.

c. Films of the resulting enamels were dried overnight. The yellowness index and the reflectance of each of the films were measured on 1.5 mil films with a Hunter Model D-25 Color and Color Difference Meter after the films had dried overnight and after they had aged for 2 months at 25° C. The results obtained are summarized in Table I.

Table I

| Loss-of-Dry Inhibitor in Enamel | Product of Ex. 1 | Basic Cobalt Naphthenate | Basic Lead Naphthenate | None |
|---|---|---|---|---|
| Amount of |  |  |  |  |

Table I-continued

| Loss-of-Dry Inhibitor in Enamel | Product of Ex. 1 | Basic Cobalt Naphthenate | Basic Lead Naphthenate | None |
|---|---|---|---|---|
| Loss-of-Dry Inhibitor in Enamel | 1.5 | 0.3 | 1.25 | — |
| (% based on Vehicle Solids) Yellowness Index* | | | | |
| Initial | 3.2 | 4.0 | 3.0 | 3.1 |
| Aged | 5.1 | 6.6 | 5.2 | 5.1 |
| Reflectance (Whiteness) %** | | | | |
| Initial | 95.8 | 94.6 | 95.6 | 95.9 |
| Aged | 96.9 | 93.2 | 96.6 | 96.9 |

*Higher readings indicate greater yellowness
**Low readings indicate more grayness The data in Table I indicate that the enamel containing the product of Example 1 showed a color response similar to that of the control enamel that contained no loss-of-dry inhibitor and to that of the enamel that contained basic lead naphthenate. All of these enamels were significantly less discolored than the enamel that contained basic cobalt naphthenate.

EXAMPLE 4 a. A black enamel that is prone to loss-of-dry on aging with conventional driers was prepared by grinding the following materials together in a ball mill:

| | Parts by Weight |
|---|---|
| Carbon black | 120 |
| Long oil soybean oil - phthalic anhydride alkyd resin containing 60% non-volatiles | 3360 |
| Mineral spirits | 844 |

This enamel contained 49.4% vehicle solids.

To the enamel was added 0.20% by weight, based on vehicle solids, of an antiskinning agent (Exkin 2) and a drier system containing 0.05% of cobalt as cobalt 2-ethylhexanoate and cobalt isononanoate and 0.15% of calcium as calcium 2-ethylhexanoate and calcium isononanoate, the percentages being the percentages of metal based on the weight of vehicle solids.

b. To portions of the black enamel were added either (i) 1.00%, 1.25%, or 1.50%, based on the weight of vehicle solids, of the product of Example 1 or (ii) 2.50% of a commercially-available loss-of-dry inhibitor (Nuact) that contains basic lead naphthenate.

c. The drying times of films of the freshly-prepared and aged enamels were measured on 2 mil wet films at 25° C. and 50% relative humidity using Improved Gardner Circular Dry Time Recorders. The results obtained are given in Table II.

Table II

| | Black Enamel Containing Prod. of Ex. 1 | | | Black Enamel Containing Basic Lead Naphthenate | Black Enamel Containing No Loss-of-Dry Inhibitors |
|---|---|---|---|---|---|
| % Loss-of-Dry Inhibitor (based on Vehicle Solids) | 1.00 | 1.25 | 1.50 | 2.50 | None |
| Drying Time (Hours:Minutes) | | | | | |
| Initial | | | | | |
| Set-to-touch | 0:45 | 0:55 | 0:55 | 0:50 | 1:00 |
| Dust-free | 1:45 | 1:50 | 1:45 | 1:45 | 1:45 |
| Thru-dry | 3:45 | 4:30 | 3:20 | 3:05 | 3:30 |
| After Aging at 49° C. for 2 Months | | | | | |
| Set-to-touch | 1:00 | 1:10 | 1:30 | 1:50 | 2:00 |
| Dust-free | 2:00 | 2:00 | 2:30 | 2:30 | 2:40 |
| Thru-dry | 3:50 | 4:00 | 1:00 | 4:55 | 4:40 |

EXAMPLE 5 a. A red enamel was prepared by grinding the following materials together in a pebble mill:

| | Parts by Weight |
|---|---|
| Toluidine red pigment | 335 |
| Long oil soybean oil - phthalic anhydride alkyd resin containing 60% non-volatiles | 3130 |
| Mineral spirits | 1377 |

This enamel had a vehicle solids content of 45.7 percent.

To this enamel were added 0.20% by weight, based on the weight of vehicle solids, of an antiskinning agent (Exkin 2) and a drier system containing 0.0625% of cobalt as cobalt 2-ethylhexanoate and cobalt isononanoate and 0.1875% of calcium as calcium 2-ethylhexanoate and calcium isononanoate, the percentages being the percentages by weight of metal based on the weight of vehicle solids.

b. To portions of the red enamel was added either (i) 1.00%, 1.25%, or 1.50%, based on the weight of vehicle solids, of the product of Example 1 or (ii) 2.50%, based on the weight of vehicle solids, of a commercially-available loss-of-dry inhibitor (Nuact) that contains basic lead naphthenate.

c. The drying times of films of the freshly-prepared and aged enamels were determined by the procedure described in Example 4c. The results obtained are given in Table III.

Table III

| | Red Enamel Containing Prod. of Ex. 1 | | | Red Enamel Containing Basic Lead Naphthenate | Red Enamel Containing No Loss-of-Dry Inhibitors |
|---|---|---|---|---|---|
| % Loss-of-Dry Inhibitor (based on Vehicle Solids) | 1.00 | 1.25 | 1.50 | 2.50 | None |
| Drying Time (Hours:Minutes) | | | | | |
| Initial | | | | | |

Table III-continued

|  | Red Enamel Containing Prod. of Ex. 1 | | | Red Enamel Containing Basic Lead Naphthenate | Red Enamel Containing No Loss-of-Dry Inhibitors |
|---|---|---|---|---|---|
| Set-to-touch | 1:45 | 1:50 | 1:40 | 2:00 | 1:50 |
| Dust-free | 3:13 | 3:15 | 3:10 | 3:10 | 3:30 |
| Thru-dry | 5:15 | 5:05 | 5:05 | 5:05 | 4:45 |
| After Aging at 49° C. for 2 Months | | | | | |
| Set-to-touch | 1:55 | 1:15 | 1:25 | 2:05 | 2:00 |
| Dust-free | 4:00 | 4:05 | 4:00 | 3:55 | 4:05 |
| Thru-dry | 5:15 | 5:20 | 5:30 | 5:20 | 6:00 |

EXAMPLE 6 a. A red enamel was prepared by grinding together the following materials in a ball mill:

|  | Parts by Weight |
|---|---|
| Toluidine red pigment | 281 |
| Long oil soybean oil - phthalic anhydride alkyd resin (Aroplaz 1241-70) | 1635 |
| Mineral spirits | 937 |
| Antiskinning Agent (Exkin 2) | 3.72 |

This enamel had a vehicle solids content of 40.0 percent.

A drier system containing 0.052% of cobalt, 0.29% of zirconium, and 0.18% of calcium was incorporated into the enamel.

b. To portions of the red enamel was added either (i) 1.25%, based on the weight of vehicle solids, of the product of Example 1, (ii) 2.50%, based on the weight of vehicle solids, of the product of Example 2, or (iii) 2.50%, based on the weight of vehicle solids, of a commercially-available loss-of-dry inhibitor (Nuact) that contains basic lead naphthenate.

c. The drying times of films of the freshly-prepared and aged enamels were determined by the procedure described in Example 4c. The results obtained are given in Table IV.

Each of the other calcium salt compositions disclosed herein can be used in a similar manner to inhibit loss of drying rate on aging of surface-coating compositions.

Table IV

|  | Red Enamel Containing Product of Ex. 1 | Red Enamel Containing Product of Ex. 2 | Red Enamel Containing Basic Lead Naphthenate | Red Enamel Containing No Loss-of-Dry Inhibitors |
|---|---|---|---|---|
| % Loss-of-Dry Inhibitor | 1.25 | 2.50 | 2.50 | None |
| Drying Time (Hours:Minutes) Initial | | | | |
| Set-to-touch | 2:25 | 2:05 | 2:55 | 2:45 |
| Dust-free | 4:40 | 5:00 | 6:20 | 8:00 |
| Thru-dry | 5:45 | 6:00 | 7:00 | 9:00 |
| After Aging for 2 Months | | | | |
| Set-to-touch | 2:15 | 2:10 | 3:10 | 4:20 |
| Dust-free | 6:30 | 7:20 | 8:45 | 14:15 |
| Thru-dry | 8:20 | 8:35 | 10:00 | 15:45 |

What is claimed is:

1. A surface-coating composition that comprises an oxidizable, organic, film-forming resinous vehicle and from 0.5% to 5.0%, based on the weight of the vehicle, of a loss-of-dry inhibitor, said loss-of-dry inhibitor being a suspension of finely-divided calcium hydroxide in a solution containing at least one calcium salt of a monocarboxylic acid selected from the group consisting of salts of branched-chain aliphatic monocarboxylic acids having 6 to 14 carbon atoms, salts of cycloaliphatic monocarboxylic acids having 6 to 10 carbon atoms, and mixtures thereof in an inert, non-polar organic solvent, said loss-of-dry inhibitor containing from 5% to 25% by weight of finely-divided calcium hydroxide and having a total calcium content of 5% to 20% by weight.

2. A surface-coating composition as defined in claim 1 that contains from 1.0% to 3.0% by weight of said loss-of-dry inhibitor.

3. A surface-coating composition as defined in claim 1 wherein the loss-of-dry inhibitor contains from 6% to 15% by weight of finely-divided calcium hydroxide.

4. A surface-coating composition as defined in claim 1 wherein the solution in which calcium hydroxide is suspended contains at least one calcium salt selected from the group consisting of salts of branched-chain aliphatic monocarboxylic acids having 8 to 10 carbon atoms, salts of naphthenic acids and mixtures of said salts.

5. A surface-coating composition as defined in claim 1 wherein the solution in which calcium hydroxide is suspended contains a hydrocarbon solvent.

6. A surface-coating composition as defined in claim 5 wherein the hydrocarbon solvent is mineral oil.

7. A surface-coating composition as defined in claim 1 wherein calcium hydroxide is suspended in a solution that comprises calcium naphthenate in mineral oil.

8. A surface-coating composition as defined in claim 1 wherein the oxidizable vehicle is an alkyd resin.

9. A surface-coating composition as defined in claim 1 that additionally contains metal salt driers.

10. A surface-coating composition as defined in claim 1 that additionally contains at least one pigment.

11. A loss-of-dry inhibitor for surface-coating compositions containing oxidizable organic vehicles that comprises a suspension of finely-divided calcium hydroxide in a solution containing at least one calcium salt of a monocarboxylic acid selected from the group consisting of salts of branched-chain aliphatic monocarboxylic acids having 6 to 14 carbon atoms, salts of cycloaliphatic monocarboxylic acids having 6 to 10 carbon atoms, and mixtures thereof, in an inert non-polar organic solvent, said suspension containing from 5 percent to 25 percent by weight of finely-divided calcium hydroxide and having a total calcium content of 5% to 20% by weight.

12. A loss-of-dry inhibitor for surface-coating compositions as defined in claim 11 that contains from 6 percent to 15 percent by weight of finely-divided calcium hydroxide.

13. A loss-of-dry inhibitor for surface-coating compositions as defined in claim 11 wherein the solution in which calcium hydroxide is suspended contains at least one calcium salt selected from the group consisting of salts of branched-chain aliphatic monocarboxylic acids having 8 to 10 carbon atoms, salts of naphthenic acids, and mixtures of said salts.

14. A loss-of-dry inhibitor for surface-coating compositions as defined in claim 11 wherein the solution in which calcium hydroxide is suspended contains calcium naphthenate.

15. A loss-of-dry inhibitor for surface-coating compositions as defined in claim 11 wherein the solution in which calcium hydroxide is suspended contains a hydrocarbon solvent.

16. A loss-of-dry inhibitor for surface-coating compositions as defined in claim 15 wherein the hydrocarbon solvent is mineral oil.

17. The method of inhibiting loss of drying rate on aging of surface-coating compositions containing an oxidizable organic vehicle that comprises incorporating in the surface-coating composition from 0.5% to 5%, based on the weight of the vehicle, of a loss-of-dry inhibitor, said loss-of-dry inhibitor comprising a suspension of finely-divided calcium hydroxide in a solution that contains at least one calcium salt of a monocarboxylic acid selected from the group consisting of salts of branched-chain aliphatic monocarboxylic acids having 6 to 14 carbon atoms, salts of cycloaliphatic monocarboxylic acids having 6 to 10 carbon atoms, and mixtures of said salts in an inert, non-polar organic solvent, said loss-of-dry inhibitor containing from 5% to 25% by weight of finely-divided calcium hydroxide and having a total calcium content of 5% to 20% by weight.

18. The method of claim 17 wherein from 1.0% to 3.0% by weight, based on the weight of the vehicle, of the loss-of-dry inhibitor is incorporated in the surface-coating composition.

19. The method of claim 17 wherein the loss-of-dry inhibitor is a suspension of calcium hydroxide in a solution comprising calcium naphthenate in mineral oil.

20. A surface-coating composition as defined in claim 1 wherein the loss-of-dry inhibitor has a degree of dispersion of at least 5 on the Hegman Scale, as determined by ASTM Method D-1210-64, and has a total calcium content of 7% to 15% by weight.

21. A loss-of-dry inhibitor for surface-coating compositions as defined in claim 11 that has a degree of dispersion of at least 5 on the Hegman Scale, as determined by ASTM Method D-1210-64, and that has a total calcium content of 7% to 15% by weight.

22. A loss-of-dry inhibitor for surface-coating compositions as defined in claim 21 that has a degree of dispersion of at least 6 on the Hegman Scale.

23. The method of claim 17 wherein the loss-of-dry inhibitor has a degree of dispersion of at least 5 on the Hegman Scale, as determined by ASTM Method D-1210-64, and has a total calcium content of 7% to 15% by weight.

* * * * *